US009387635B2

(12) United States Patent  
Ikonomov et al.

(10) Patent No.: US 9,387,635 B2
(45) Date of Patent: Jul. 12, 2016

(54) METHODS AND APPARATUS FOR DEFLECTING AND SUPPORTING A TIRE SIDEWALL

(75) Inventors: Metodi L. Ikonomov, Clermont-Ferrand (FR); Adib Tony Chebli, Greer, SC (US); Cesar E. Zarak, Simpsonville, SC (US); E. Bruce Colby, Greenville, SC (US)

(73) Assignees: Michelin Recherche et Technique S.A., Granges-Paccot (CH); Compagnie Generale des Etablissements Michelin, Clermont-Ferrand (FR)

( * ) Notice: Subject to any disclaimer, the term of this patent is extended or adjusted under 35 U.S.C. 154(b) by 0 days.

(21) Appl. No.: 14/348,315

(22) PCT Filed: Sep. 30, 2011

(86) PCT No.: PCT/US2011/054370
§ 371 (c)(1),
(2), (4) Date: Mar. 28, 2014

(87) PCT Pub. No.: WO2013/048464
PCT Pub. Date: Apr. 4, 2013

(65) Prior Publication Data
US 2014/0248825 A1    Sep. 4, 2014

(51) Int. Cl.
*B29C 73/10*     (2006.01)
*B24B 41/06*     (2012.01)
*B29C 73/08*     (2006.01)
(Continued)

(52) U.S. Cl.
CPC ............ *B29C 73/08* (2013.01); *B24B 41/06* (2013.01); *B29C 73/12* (2013.01); *B29C 73/26* (2013.01); *B60C 25/16* (2013.01); *B29C 73/10* (2013.01);
(Continued)

(58) Field of Classification Search
CPC ...... B24B 41/06; B24B 37/042; B24B 49/16; B29C 73/08; B29C 73/12; B29C 73/10; B29C 2073/262; B60C 25/16; B29L 2030/00; Y10T 29/49998
USPC ........................................ 451/28, 365; 29/559
See application file for complete search history.

(56) References Cited

U.S. PATENT DOCUMENTS 1,345,849 A    7/1920   Harkins
1,954,031 A    4/1934   Wood
(Continued)

FOREIGN PATENT DOCUMENTS

DE         9407662 U1     7/1994
WO      2009070146 A1     6/2009

OTHER PUBLICATIONS

PCT/US2011/054370 International Search Report and Written Opinion, 12 pages, dated Feb. 27, 2012.

*Primary Examiner* — George Nguyen
(74) *Attorney, Agent, or Firm* — Hahn Loeser & Parks LLP

(57) ABSTRACT

Particular embodiments of the invention include methods and apparatus for deforming a tire sidewall. Such methods include the step of providing a tire having at least one sidewall connected to a corresponding bead. A further step includes constraining at least one of the sidewall and bead from moving laterally toward the other. Yet another step of such methods includes engaging the sidewall with an inclined member. Another step of such methods includes moving at lest one of the sidewall and bead in a lateral direction away from the other until the sidewall is laterally deformed into a laterally deformed configuration.

20 Claims, 3 Drawing Sheets

(51) Int. Cl.
  *B29C 73/12* (2006.01)
  *B29C 73/26* (2006.01)
  *B60C 25/00* (2006.01)
  *B29L 30/00* (2006.01)

(52) U.S. Cl.
  CPC ....... *B29C 2073/262* (2013.01); *B29L 2030/00* (2013.01); *Y10T 29/49998* (2015.01)

(56) References Cited

U.S. PATENT DOCUMENTS

| | | | |
|---|---|---|---|
| 2,073,510 A | | 3/1937 | Bishman |
| 2,205,939 A | * | 6/1940 | Wilson .......................... 451/246 |
| 2,696,021 A | | 12/1954 | Cox et al. |
| 2,707,851 A | * | 5/1955 | Strong ............................ 451/57 |
| 2,784,937 A | | 3/1957 | Lefke |
| 2,928,119 A | | 3/1960 | Fassero et al. |
| 2,986,849 A | * | 6/1961 | Clark ............................. 451/58 |
| 3,038,203 A | | 6/1962 | Gross |
| 3,044,116 A | | 7/1962 | Spitzmiller et al. |
| 3,128,579 A | * | 4/1964 | Kehoe et al. ................... 451/28 |
| 3,172,243 A | * | 3/1965 | Laube ............................ 451/28 |
| 3,290,831 A | * | 12/1966 | Laube ........................... 451/254 |
| 3,825,965 A | * | 7/1974 | Root et al. ..................... 15/88.3 |
| 3,849,941 A | * | 11/1974 | Barnes .......................... 451/342 |
| 3,914,907 A | * | 10/1975 | Hofelt et al. .................... 451/28 |
| 3,932,965 A | * | 1/1976 | Kline, Jr. ......................... 451/58 |
| 3,953,942 A | * | 5/1976 | Nisimura ...................... 451/123 |
| 3,963,427 A | * | 6/1976 | Ugo ................................. 451/1 |
| 4,014,375 A | * | 3/1977 | Malinski et al. .............. 157/1.17 |
| 4,084,350 A | * | 4/1978 | Ongaro .............................. 451/5 |
| 4,139,041 A | * | 2/1979 | Newton ......................... 157/13 |
| 4,173,850 A | * | 11/1979 | Gormish et al. ................. 451/28 |
| 4,261,406 A | * | 4/1981 | Chemizard et al. ............ 152/152 |
| 4,837,980 A | * | 6/1989 | Rogers, Jr. ........................ 451/5 |
| 5,044,607 A | | 9/1991 | Haugen et al. |
| 5,099,613 A | * | 3/1992 | Rogers, Jr. ...................... 451/24 |
| 5,179,806 A | * | 1/1993 | Brown et al. ..................... 451/5 |
| 5,218,789 A | * | 6/1993 | Ino et al. .......................... 451/1 |
| 5,307,853 A | * | 5/1994 | Okuda .......................... 152/540 |
| 6,139,401 A | * | 10/2000 | Dunn et al. ..................... 451/10 |
| 6,729,179 B2 | * | 5/2004 | Crema et al. .................... 73/146 |
| 6,773,334 B1 | * | 8/2004 | Mallison ........................ 451/38 |
| 7,264,032 B2 | * | 9/2007 | Peinelt et al. ................. 157/1.22 |
| 8,151,783 B2 | * | 4/2012 | Baratta .......................... 125/15 |
| 2010/0243127 A1 | | 9/2010 | Chebli et al. |

\* cited by examiner

METHODS AND APPARATUS FOR DEFLECTING AND SUPPORTING A TIRE SIDEWALL

This application is a National Stage application of International Application No. PCT/US2011/054370, filed Sep. 30, 2011, to which this application claims priority and the benefit of, the disclosure of which is also herby incorporated by reference.

BACKGROUND OF THE INVENTION

1. Field of the Invention

This invention relates generally to methods and apparatus for altering the orientation and supporting a tire sidewall in preparation for repairing the inside of a tire surface.

2. Description of the Related Art

It is often necessary to perform operations along an inner side of a tire. For example before applying a patch along the inner tire surface, the inner tire surface is prepared for patch application. Preparation may include performing certain functions, such as buffing the inner surface of the tire, applying a texture to the inner surface of the tire, and/or applying bonding material to the inside surface of the tire. Further functions may include installing the patch or other components onto the tire, such as electronic sensors, RFID tags, or identification markings.

To perform such operations, it is necessary to gain access to the inner surface of the tire and introduce different tools into the annular interior tire cavity. This may be problematic when a tire, due to the curvature of the tire sidewall, does not afford the access necessary for such tools. Further, it may be necessary to support the tire sidewall when performing certain operations on the inner surface of the tire, such as to resist any forces being applied to the sidewall by the operation.

SUMMARY OF THE INVENTION

Particular embodiments of the present invention include methods for deforming a tire sidewall. Particular embodiments of such methods include the step of providing a tire having at least one sidewall connected to a corresponding bead. A further step includes constraining at least one of the sidewall and bead from moving laterally toward the other. Yet another step of such methods includes engaging the sidewall with an inclined member. Another step of such methods includes moving at least one of the sidewall and bead in a lateral direction away from the other until the sidewall is laterally deformed into a laterally deformed configuration.

Other embodiments of the present invention include apparatus for deforming a tire sidewall. Particular embodiments of the apparatus include a tire receiving area including a means for securing the tire within the tire receiving area. The apparatus further includes a constraining member for laterally constraining one of a bead and a corresponding sidewall. The apparatus also includes an inclined member having a sidewall-deforming surface configured to support at least a portion of a tire sidewall when arranged in a laterally deformed configuration. Further, the apparatus includes an actuating device for moving one of a bead and a corresponding sidewall of a tire.

The foregoing and other objects, features and advantages of the invention will be apparent from the following more detailed descriptions of the prior embodiments of the invention, as illustrated in the accompanying drawing wherein like reference numbers represent like parts of the invention.

DETAILED DESCRIPTION OF PARTICULAR EMBODIMENTS

Figure 1A:
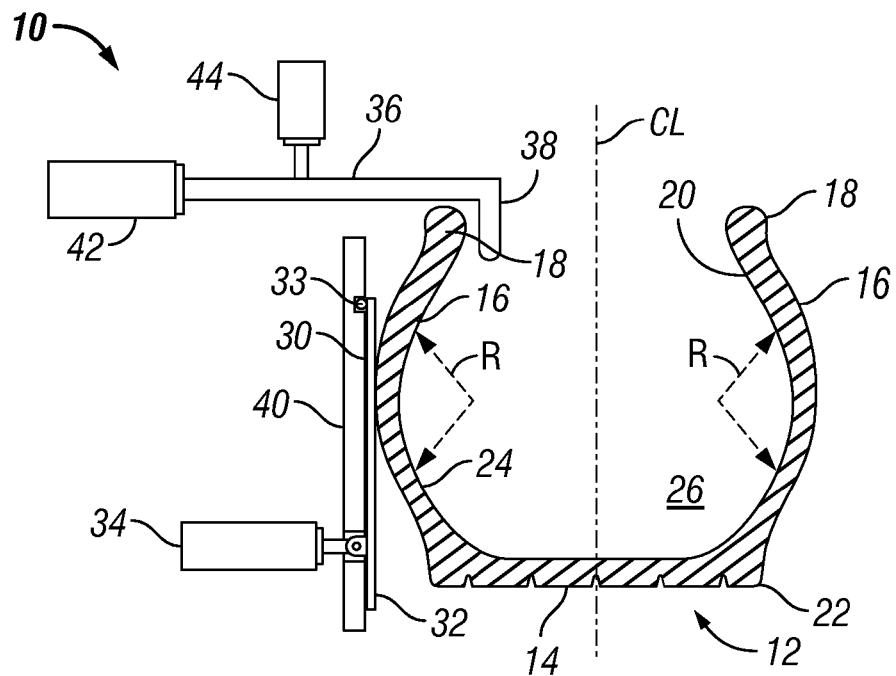
FIG. 1A is a sectional side view of a tire shown in an undeformed configuration and arranged within an apparatus for deflecting and supporting a tire sidewall, according to a particular embodiment of the invention.

Particular embodiments of the present invention provide a tire deforming and support apparatus, which applies a force to at least a portion of the tire sidewall to deflect the tire sidewall causing the radius of the curvature of the tire sidewall to increase or expand laterally. The increased radius of curvature of the tire sidewall results in more laterally arranged sidewall, a sidewall that would otherwise be more radially arranged. This increased curvature provides a sidewall that is flatter than the undeformed sidewall (i.e., unfolded). The lateral expansion (i.e., unfolding) of the sidewall may also widen the spacing between opposing beads of the tire. Accordingly, the flatter, more laterally arranged sidewall may be more easily accessed by an operator or a tool for performing operations along an inner surface of the tire. Further, the sidewall may be better supported by this apparatus when maintained in the deformed configuration, which may improve the performance of the operations being performed along the inner tire surface since more resistance is provided (i.e., a more rigid sidewall may be worked upon).

In particular embodiments, methods for laterally expanding a tire sidewall may include the step of providing a tire having at least one sidewall connected to a corresponding bead. Generally, tires have a torus shape, whereby an outer diameter of the torus is generally flat to form an annular tire tread. Along an inner diameter of the torus is an annular opening extending between axially offset bead portions. The annular opening provides access to an annular interior tire cavity, which forms a pressurization chamber when the tire is mounted on a rim. The tire also includes a central opening extending through the tire, the opening extending axially between the opposing beads and radially inward from the beads between the beads and a rotational axis of the tire. Further, tires generally include a pair of sidewalls, extending between the bead portions and the outer diameter of the torus shape, which his generally referred to the tire crown. The tire crown is the location where treads are arranged along the tire carcass.

Such methods for laterally expanding a tire sidewall may further include the step of constraining at least one of the sidewall and bead from moving laterally toward the other. Because relative movement between a corresponding bead and sidewall may be achieved by moving either or both the sidewall and the bead away from each other, at least one is constrained from moving laterally toward the other. This contemplates that either or both of the sidewall and bead may be constrained from moving laterally toward the other while still being able to move laterally away from each other. In particular embodiments, however, the bead and/or sidewall may be constrained in a lateral position that prevents movement in either lateral direction. For example, the bead may be fixed or constrained in a lateral position, whereby the bead is fully constrained from any lateral movement, while in other arrangements the bead may be laterally constrained from only moving laterally toward the sidewall. Because the bead may move radially when relative movement occurs between the sidewall and bead, in particular embodiments, the step of constraining each of the sidewall and bead from moving laterally toward the other includes allowing the bead to move in a radial direction of the tire during the step of moving at least one of the sidewall and bead in a lateral direction away from the other.

Such methods for laterally expanding a tire sidewall may further include the step of engaging the sidewall with an inclined member. Because relative movement between a corresponding bead and sidewall is desired, inclined member may be configured to remain stationary or in a fixed location while the bead is moved away from the sidewall. Additionally, or in the alternative, inclined member may move while bead either remains stationary or also moves. Movement may be accomplished by translation or rotation. Accordingly, engagement may occur when moving the inclined member relative the tire and into a sidewall engaging position, or when the tire is arranged relative the sidewall such that the sidewall is positioned or moved into a sidewall engaging position.

Such methods for laterally expanding a tire sidewall may further include the step of moving at least one of the sidewall and bead in a lateral direction away from the other until the sidewall is laterally deformed into a laterally deformed configuration. Relative movement between a corresponding bead and sidewall may be achieved by moving either or both the sidewall and the bead away from each other. In particular embodiments, the bead is moved laterally into a laterally constrained position, and subsequently the inclined member is moved laterally opposite the bead to force the sidewall to move laterally opposite the bead to achieve a desired, laterally deformed configuration.

In the laterally deformed configuration, the sidewall is deformed such that it is expanded laterally, such as to unfold or uncurl the sidewall and reorient the sidewall in more of a lateral arrangement or a laterally expanded arrangement. In particular, the arrangement may provide a more inclined sidewall—in lieu of an undeformed sidewall that typically extends in a radial direction. An inclined configuration such that the sidewall extends radially outward and laterally inward in a direction from the bead to the tire crown area. Further, the sidewall may be locally flatter, whereby the undeformed curvature of the sidewall is reduced and, in particular instances, may be considered generally flat.

Such methods for laterally expanding a tire sidewall may further include the step of maintaining the sidewall in the laterally deformed configuration. Maintaining the sidewall may be accomplished by maintaining each the bead and the sidewall in a lateral position upon reaching the desired sidewall configuration. In particular embodiments, the step of maintaining the sidewall in the laterally deformed configuration includes maintaining the inclined member in a position at which the laterally deformed configuration of the sidewall is achieved. This step may be performed, for example, by positionally fixing the bead and sidewall upon achieving the laterally deformed configuration. Fixation may occur in all directions or just the lateral directions. This step may also be performed when the bead is held fixed and the inclined member is moved to facilitate deflection of the sidewall and maintained laterally upon achieving the laterally deformed configuration. This supposes that structure may be arranged adjacent the sidewall to assist in maintaining the sidewall in the laterally deformed configuration. For example, the inclined member may be arranged along the outer side of the sidewall to maintain and/or support the sidewall in its laterally deformed configuration. This inclined member may comprise a plate, for example. Accordingly, when maintaining the tire sidewall in the laterally deformed configuration, the step may further include supporting the deformed sidewall while arranged in the laterally deformed configuration. In particular embodiments, supporting of the deformed sidewall may be accomplished by the inclined member, which may be fixed or maintained in any desired position by an actuating member, for example. Supporting the deformed sidewall may facilitate performance of the tire operations along the inner tire surface when such operations could benefit from operating along a more rigid or stable surface. For example, when performing abrading operations along the inner tire surface, an abrading tool is forcefully applied to the inner tire surface. Therefore, it would be beneficial to support the inner tire surface of the sidewall (such as by way of the outer sidewall surface) to maintain the inner surface in the deformed configuration as the tool is forcefully applied.

It follows that, in particular embodiments, the step of maintaining the sidewall in the laterally deformed configuration includes performing such step while a tire operation is performed along an inner surface of the tire. By maintaining the sidewall in its laterally deformed configuration, various tire operations may more easily be performed along the sidewall on the inner side of the tire. For example, a tire operation may include preparing a portion of the inner surface for application of a tire patch. Another operation may include installing a tire patch on the inner tire surface. Tire patches are often installed along the tire sidewall on an inner tire surface. A patch may be desired to repair a damaged area, and/or to provide electronic sensors, RFID tags, or other identification markings for the purpose of communicating information. In preparing the surface for patch installation, a damaged portion of the tire may be removed. Further, a portion of the inner surface may be removed, roughened, texturized, and/or cleaned in preparation for receiving the patch, each of which may be accomplished by an abrading or buffing operation. Patch adhesive may also be applied to the inner surface before patch application. These operations may be performed manually with hand tools or automatically with powered tools. The increased radius of the curvature of the tire increases the opening to introduce the necessary tools and machines into the tire cavity to perform certain functions.

Such methods of deforming a tire sidewall may include repeating various steps for the purpose of performing a tire operation on another portion of the tire sidewall. Further, it is understood that the steps discussed may be performed manually or automatically, at least in part, by use of a logical processor configured to perform instructions for performing the method steps.

Exemplary embodiments of a tire sidewall deforming and supporting apparatus for use in performing such methods are discussed in further detail below.

With reference to the embodiment of FIG. 1A, a schematic side view of a tire sidewall deflection and support apparatus 10 is shown in conjunction with a tire 12 (shown in cross-section). Tire 12 includes opposing sidewalls 16 extending radially inward from a tread portion 14. Beads 18 are arranged at a terminal end of each sidewall radially opposite the tread portion 14. The tire has a thickness bounded by an inner side 20 and an outer side 22. Each radially extending sidewall is generally shaped according to a particular curvature in an undeformed state. The curvature along the inner tire surface is generally represented by radius R.

As discussed above, it may be desirous to alter the shape of a tire sidewall to better access the inner tire surface along a sidewall, such as for the purpose of performing tire repair operations. Particularly, apparatus 10 alters the shape and orientation of a tire sidewall 16 from an undeformed, generally radial configuration (see FIG. 1A) to a more inclined, laterally expanded, flattened configuration, which is also referred to as a laterally deformed configuration (see FIG. 1B). This may be achieved by relatively moving the bead in a laterally direction opposite the sidewall. This may be achieved by moving the bead laterally away from a laterally constrained sidewall, moving the sidewall laterally away from a laterally constrained bead, or moving each laterally away from the other. Although each of these embodiments are contemplated, for explanation purposes, the embodiments shown in the figures represent a bead that is laterally constrained while a force is applied to the sidewall to cause the sidewall to laterally move away from the corresponding bead.

With further reference to FIG. 1A, apparatus 10 includes an inclined member 30 having an outer, sidewall-deflecting face 32 for arrangement adjacent a tire sidewall 16 when tire 12 is positioned within a tire-receiving area of the apparatus. Inclined member 30 comprises a structure sufficient to withstand a force being applied to the sidewall to cause the sidewall to deform as desired and to maintain and support the sidewall in the deformed configuration. Inclined member 30 also may be configured to withstand one or more forces being applied along an inner surface of the sidewall or tire. For example, inclined member 30 is formed of a metallic or plastic plate.

Sidewall-deflecting face 32 is generally shaped to arrange a portion of the tire sidewall 16 in a generally flat or flatter configuration. In other words, with reference to FIGS. 1A-1B, the inner curvature of the sidewall 16 as represented generally by radius R is reduced such that radius R increases and may even approach infinity when the portion of the sidewall becomes flat or planar. Accordingly, with reference to FIG. 1A, the sidewall-deflecting face 32 may be generally flat or planar, where "generally" connotes that the surface may include small undulations, contours, surface texture or voids, or other variations such that the face remains sufficiently flat or planar to achieve its intended purpose of deflecting and supporting a portion of the sidewall in a laterally deformed configuration. In any event, the sidewall-deflecting face 32 may comprise any other shaped or contoured surface sufficient to achieve its previously stated purpose.

Figure 1B:
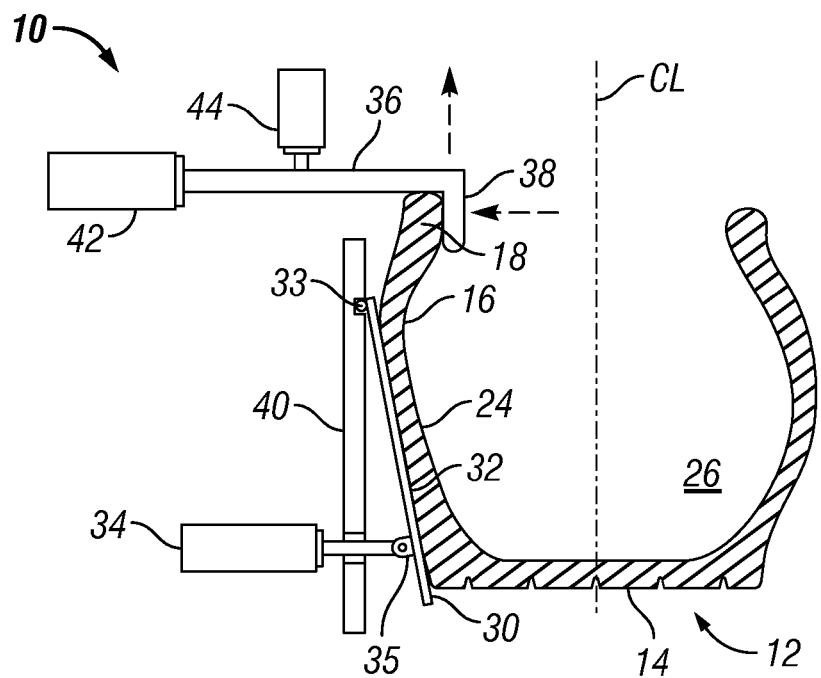
FIG. 1B is a sectional side view of the embodiment of FIG. 1A, the apparatus shown deforming and supporting a tire sidewall in a laterally deformed configuration according to an embodiment of the invention.
Figure 2:
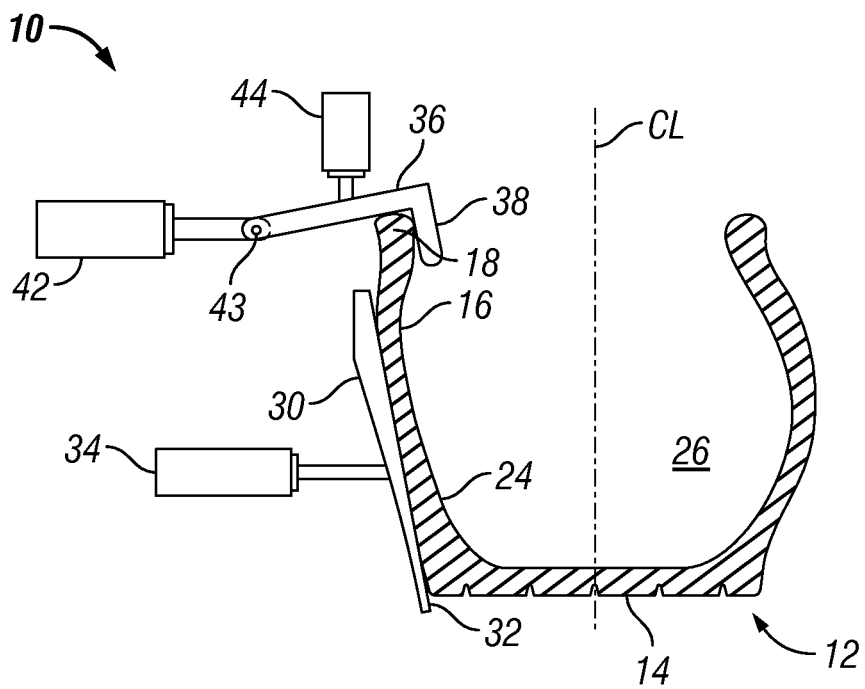
FIG. 2 is a sectional side view of an alternative embodiment to the apparatus of FIG. 1A, the tire shown with the sidewall deformed into a laterally deformed configuration in similar fashion to the tire in FIG. 1B.

Because relative movement between a corresponding bead 18 and sidewall 16 is provided, inclined member 30 may be configured to remain stationary or in a fixed location while the bead is moved away from the sidewall. Additionally, or in the alternative, inclined member 30 may move while bead 18 either remains stationary or moves. Movement may be accomplished by translation or rotation. In the embodiments shown in the figures, inclined member 30 moves while the bead remains laterally constrained. With specific reference to FIG. 1A, inclined member 30 is pivotable from a fulcrum 33 by use of a hinge or other known means of achieving pivoting movement. More specifically, inclined member 30 is rotationally (i.e., pivotably) attached to a back plate 40, which also supports and limits the counter-rotation of the inclined member. Of course, inclined member 30 may be rotationally attached to any structure. In FIG. 1A, inclined member 30 is shown in a non-rotated, non-inclined configuration when in a sidewall non-deflecting arrangement. In FIG. 1B, inclined member 30 is in a rotated, inclined configuration when in a sidewall-deflecting arrangement. With reference to FIG. 2, a rotationally fixed inclined member 30 is shown, whereby inclined member translates between sidewall non-deflecting arrangement and a sidewall deflecting arrangement.

It is understood that inclined member 30 and sidewall-deflecting face 32 may be arranged at, or rotate, any predefined angle or translate any predefined distance to achieve a desired deformed sidewall configuration. For example, incline member 30 and sidewall-deflecting face 32 may be arranged at an angle of 15 degrees relative a radial direction or plane that is parallel to the centerline CL of the tire. While such angle or distance may sufficiently achieve the desired deformation of a tire sidewall, each may also be selected to sufficiently limit any further movement for the purpose of preventing any damage to the sidewall, and more generally the tire.

Inclined member 30 and sidewall-deflecting face 32 are movable by rotation or translation by way of an actuating device 34. Actuating device 34 generally moves sidewall-deflecting face 32 and member 30 in a lateral or axial direction toward an outer side 22 of an adjacent tire sidewall 16 and forcefully causes the face 32 and member 30 to deform at least a portion of the tire sidewall 16 into a flatter shape. Actuating device 34 may also maintain inclined member 30 and sidewall-deflecting face 32 in the sidewall-deflecting arrangement, such that sidewall 16 is maintained in a desired, deformed configuration while the inclined member 30 and sidewall-deflecting face 32 remain engaged with the sidewall to sufficiently support tire repair operations being performed along the inner surface 24 of the sidewall within the annular interior tire cavity 26. For example, the sidewall-deflecting face 32 may allow a tool to apply greater pressure on the inner surface 24 of the tire sidewall 16. In lieu of the actuating device 34 maintaining the inclined member 30 and sidewall-deflecting face 32 in a sidewall-deflecting arrangement or position, the face may be otherwise locked into this position while the actuating member retracts from engagement with the inclined member 30.

Actuating device 34 may comprise any device or means capable of forcing the sidewall-deflecting face 32 toward the tire sidewall 16 and to subsequently deform the sidewall into a laterally deformed configuration. For example, with reference to FIGS. 1A-2, actuating device 34 comprises an actuator or cylinder, such as a pneumatic or hydraulic cylinder or a linear actuator. Other exemplary actuating devices may comprise a threaded screw device or rack and pinion device. By further example, with reference to FIGS. 4-5, actuating device 34 comprises an expandable bladder or bellow, which may be expanded by any desired fluid, such as any gas or liquid. The bladder 34 may be arranged between a back plate 40 (or any other structure) and the inclined member 30, as is shown exemplarily in FIG. 3. The bladder may also be arranged to directly engage the sidewall, such that the bladder becomes the inclined member 30 and a portion thereof becomes the sidewall-deflecting face 32. The bladder may be formed of any elastic material and may be reinforced internally or externally with any elastic or non-elastic material, such as metal or fabric cords or plates, for example, to provide a bladder or a portion of a bladder having a desired shape upon partial or full expansion thereof. It is understood that obtaining such a desired shape upon partial of full expansion of the bladder may be achieved without use of reinforcements, such as by molding or otherwise forming the bladder into any desired shape. For example, a sidewall-deflecting face of the bladder configured to engage the inclined member 30, such as is shown by example in FIG. 3, or the tire sidewall 16 (not shown) may be formed or shaped such that the sidewall-deflecting face 32 is generally flat or otherwise shaped to manipulate and support the sidewall 16 into a desired laterally deformed configuration.

Actuating device 34 may be operably attached to inclined member 30 by any known means. For example, with reference to FIGS. 1A-1B, a pivotable connection 35 is provided. With reference to FIG. 2, a fixed, non-pivotable connection is provided. By further example, a linkage (not shown) comprising one or more links may be arranged between actuating device 34 and inclined member 30. A linkage may combine rotational movement with translational movement to achieve any desired movement. Further, a translational guide mechanism (not shown) may be used to guide and/or limit the translation of any inclined member 30 and/or any actuating device 34. It is also understood that actuating device 34 may not be connected to inclined member 30, but rather is aligned to freely engage and disengage the inclined member 30 or the tire sidewall 16 to facilitate sidewall deformation and support.

With reference to FIGS. 1A-1B, actuating device 34 is arranged to extend through an aperture arranged within a back member 40 to operably engage or connect to inclined member 30, while in other embodiments (not shown) actuating device is arranged to extend about back plate 40. Accordingly, actuating device 34 may be arranged to extend through or about any structure arranged between inclined member 30 and the actuating member 34.

As discussed above, a bead 18 corresponding to a sidewall 16 may be constrained laterally to achieve a desired sidewall deflection. Accordingly, apparatus 10 may include a means for retaining or constraining the bead 18 associated with the targeted tire sidewall 16. With reference to FIG. 1A, such means may comprise a bead-constraining member 36 having a bead-capturing portion 38 extending radially outward relative the tire sidewall. It can also be said that both sidewall-deflecting face 32 and bead-capturing portion 38 extend in a radial direction relative to a rotational axis of the tire. In the embodiment of FIG. 1A, bead-capturing portion 38 comprises an extension (i.e., a lip or protrusion) configured to extend radially outward within the annular interior tire cavity. Bead-capturing portion 38 constrains the lateral movement of a bead 18. In operation, bead constraining member 36 and bead-capturing portion 38 may remain fixed, or may move between bead receiving and constraining positions. When moving between bead receiving and constraining positions, bead 18 may move laterally with the bead constraining member 36 and the bead-capturing portion 38, which his shown by example in FIG. 1B. Because the bead may also move radially as it moves laterally, the act of constraining may be performed before laterally deflecting the sidewall.

Figure 4:
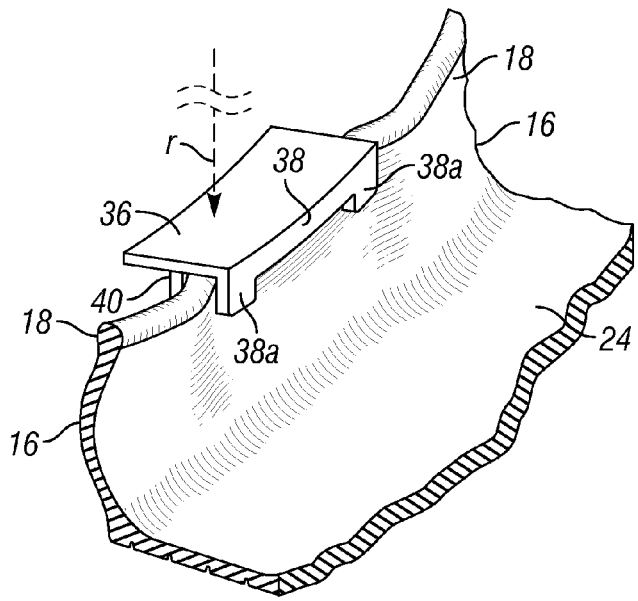
FIG. 4 is a top perspective view of a bead-constraining member of the apparatus of FIG. 1A, according to a particular embodiment of the invention.

With reference to FIG. 4, bead-constraining member 36 and bead-capturing portion 38 extend in a lengthwise direction along an arcuate path defined by radius r, where the radius r may be concentric with a rotational axis of the tire. By extending lengthwise in a circumferential direction, bead-constraining member and the bead-capturing portion may be more closely aligned with the bead for improved engagement with the bead, as each extend longitudinally in a similar path. It is understood, in certain embodiments, that the arcuately-extending bead-constraining member 36 and/or bead-capturing portion 38 extends circumferentially to form a ring for engaging the bead, such as when the entire circumferential length of a sidewall is to be deformed. In yet other alternatives to the embodiment shown, bead-constraining member 36 and bead-capturing portion 38 may extend lengthwise linearly or in any other non-linear path. Also shown in FIG. 4 is a variation of the bead-capturing portion 38, which includes one or more lobes 38a extending radially outward in a depthwise direction from the bead-capturing portion, where portions of reduced depth are arranged between the lobes. Still, in other embodiments, lobes 38a may not be present, and instead the full depth of the bead-capturing portion 38 may be employed to provide additional contact surface for bead engagement, which may better distribute the localized forces and stresses acting on the bead. The profile of the bead-capturing portion and/or of the bead-constraining member 36 may be pre-selected based on the profile of the bead 18 for engagement.

In other embodiments (not shown), bead-capturing portion 38 comprises a portion of a radially-extending member, which may form the bead-constraining member 36. It is understood that bead-constraining member 36 and bead-capturing portion 38 shown are exemplary embodiments only, and instead may comprise any other desired structure configured in any laterally deformed configuration sufficient to constrain a bead 18 from substantial lateral translation.

With reference to FIGS. 1A-1B, an actuator 42 is operably connected to the bead-constraining member 36, for the purposes of laterally moving the bead-constraining member 36 and the bead-capturing portion 38 between a bead-receiving position (see FIG. 1A) and a bead-constraining position (see FIG. 1B), where the bead is not laterally constrained (i.e., where the bead is capable of lateral movement). Actuator 42 may comprise any known actuator, such as any device contemplated above with regard to actuating device 34, which includes any pneumatic or hydraulic cylinder or linear actuator. Bead-constraining member 36 may also be movable manually, which then may be locked into a bead-constraining position by any known means for securing bead-constraining member positionally, such as by any mechanical means, which includes one or more fasteners (such as any pin, bolt, etc.), or by any magnetic means, for example.

In operation, with specific reference to FIG. 1B, actuator pulls the bead and pinches the bead between the bead-capturing portion 38 and the back plate 40 to fully constrain the bead laterally (i.e., to substantially prevent any lateral movement of the bead). It is understood that the bead may be pinched between the bead-capturing portion and any other desired structure. Further, it is understood that bead 18 may be not be pinched or fully constrained laterally, but rather constrained only from moving in a lateral direction toward the sidewall.

Bead-capturing portion 38 extends along an inner surface of the tire to constrain bead 18 axially, that is, to generally prevent substantial movement of bead 18 laterally as the corresponding sidewall is forced laterally inward away from the bead by the actuating device 34. By generally resisting the lateral movement of the bead 18 toward the sidewall 16 and the movement of the sidewall toward the bead, the sidewall 16 may deform and laterally extend (i.e., open up laterally) as desired. This also allows a central lateral opening arranged between opposing beads 18 (i.e., the opening to the annular interior tire cavity 26) to remain open, allowing tools or other devices to enter the interior cavity 26 for performing desired operations.

However, when a sidewall deforms laterally relative the bead, the associated bead constrained by bead-constraining member 36 may desire to move not only laterally but also radially. For example, bead 18 may tend to translate radially inward (i.e., toward the tire rotational axis) or radially outward (i.e., away from the rotational axis of the tire) when being moved away from the sidewall. With reference to FIG. 1B, this movement may occur when the bead-constraining member 36 pulls the bead into a constrained position, and when the tire sidewall is being deflected by inclined member 30 or sidewall-deforming surface 32. In certain instances, preventing this radial movement may hinder the proper formation and manipulation of the sidewall. Therefore, in particular embodiments, this desired radial bead movement may be accommodated by configuring bead-constraining member 36 to translate radially at the direction of bead 18 as a corresponding sidewall 16 is deformed.

To allow bead-constraining member 36 to both constrain the bead 18 laterally and permit the bead to move radially as needed, a bead-constraining member 36 is configured to not only translate radially (rotationally and/or linearly), a pressure or biasing member 44 is operably attached to the bead-constraining member 36 to bias the bead-constraining member toward the constrained bead. For example, with reference to FIGS. 1A-1B, biasing member 44 biases the bead-constraining member 36 radially outward away from the rotational axis of the tire. Biasing member 44 is arranged radially to allow the bead-constraining member 36 to move only in a radial direction. It is understood that biasing member 44 may comprise any device capable of providing a force sufficient to bias the bead-constraining member toward the bead 18, yet a force small enough that it can be overcome by the bead when desiring to move radially. For example, biasing member may be any coiled spring or air spring having a desired spring constant, a device utilizing repulsive magnetic forces, a hydraulic or pneumatic cylinder, or any electrical actuator. Bead-constraining member 36 may also be arranged along a rack and pinion (i.e., a track or guide) (not shown) to better control its movement once the bead-constraining member is arranged in a bead-constraining arrangement (i.e., a bead is arranged within the bead-constraining member), and to limits its movement to radial translation when in the bead-constraining arrangement.

In an alternative embodiment, with reference to FIG. 2, the bead-constraining member 36 is hinged or pivotable relative the tire, such as by providing a pinned or hinged connection 43 between the bead-constraining member 36 and the actuator 42 or any other desired structure. By being pivotable, the bead-constraining member 36 is capable of moving radially as needed by the bead. In FIG. 2, a biasing member 44 is operably in communication with the pivotable bead-constraining member 36, while in other variations, a pivotable bead-constraining member is freely pivotable without use of any biasing member.

Figure 3:
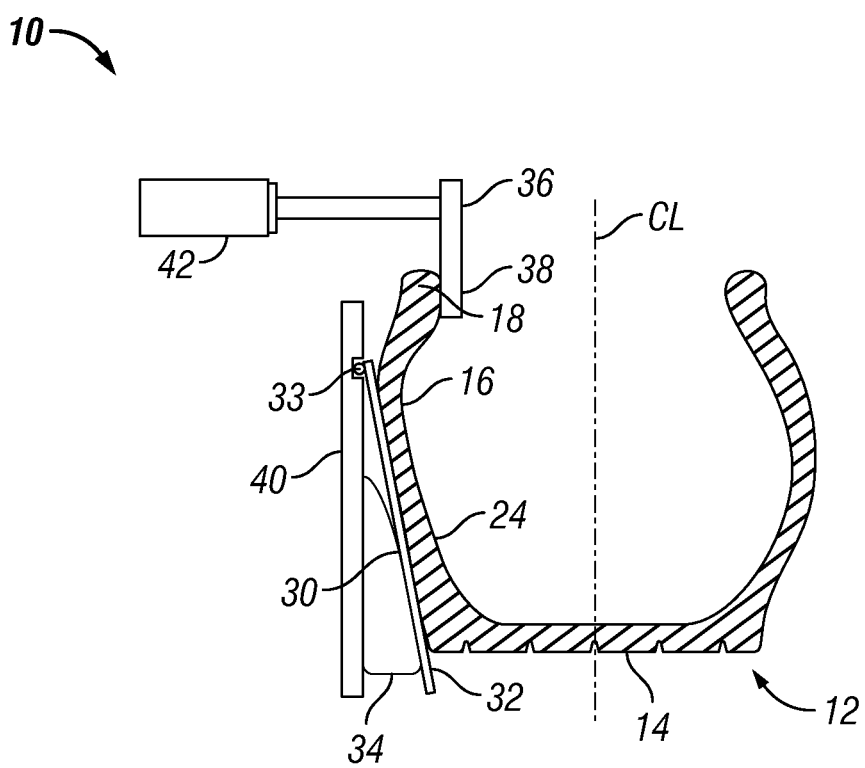
FIG. 3 is a sectional side view of an alternative embodiment to the apparatus of FIG. 1A, the tire shown with the sidewall deformed into a laterally deformed configuration in similar fashion to the tire in FIG. 1B.

In yet another alternative embodiment, with reference to FIG. 3, bead-capturing portion 38 extends a sufficient distance from the bead-constraining member 36 to form a gap between the bead and the bead-constraining member unlike the embodiments of FIGS. 1A-2. This gap allows the bead to move radially as needed without structural limitation, while also constraining the bead laterally.

Figure 5:
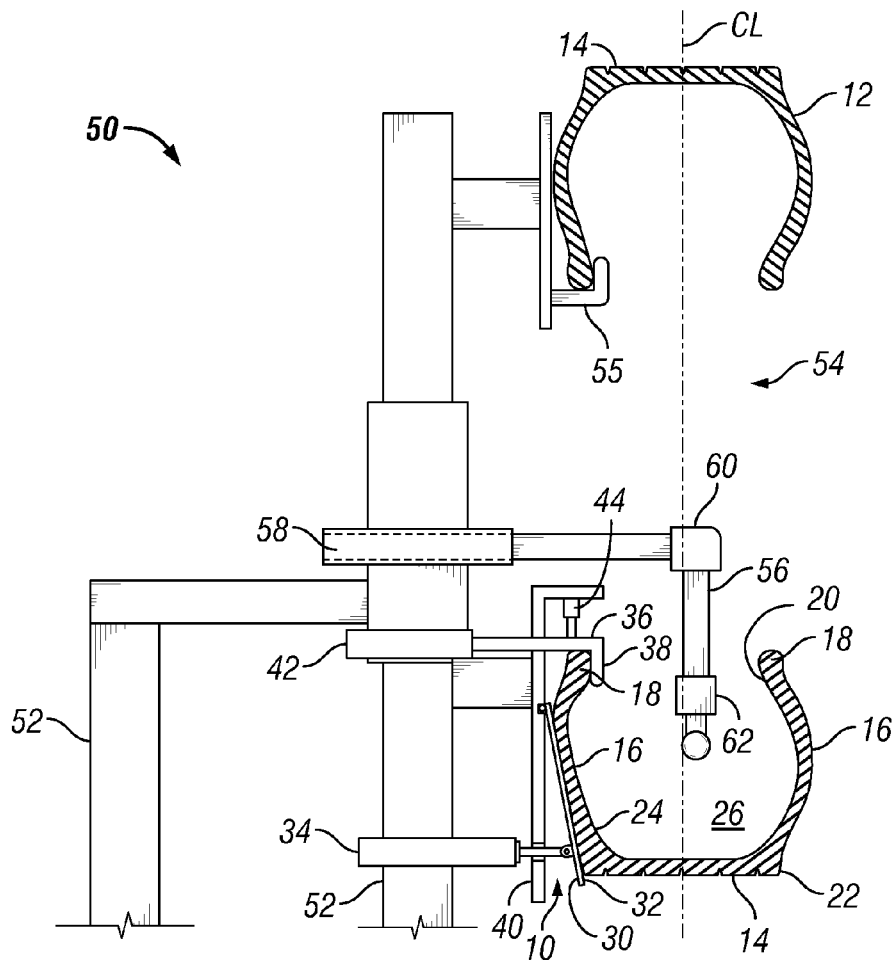
FIG. 5 is a side view of a machine for performing operations along an inner side of a tire, the machine incorporating the apparatus for deflecting and supporting a sidewall of the tire according to an embodiment of the invention.

With reference to FIG. 5, an exemplary embodiment of a machine 50 for performing tire repair operations is shown, which incorporates the tire sidewall deflection and support apparatus 10 described more specifically above. Particularly, machine 50 includes a frame 52 and a tire receiving area 54 in which a tire 12 is secured to arrange a sidewall 16 adjacent apparatus 10 and, in particular, inclined member 30. Tire 12 is secured within machine 50 and tire receiving area 54 by any means for securing the tire in a stationary arrangement. For example, with reference to FIG. 5, tire 12 is suspended from hook-like member 55 by engaging a bead 18 of the tire. Other means of securing may comprise any other device or member for suspending, grasping, maintaining, or fixing the tire within the tire receiving area 54 in any arrangement. Such means for securing may engage any portion of the tire, whether the bead, sidewall, tread, or any inner or outer surface of the tire. Such means may also extend annularly relative the tire or any other portion thereof. The machine 50 also includes a tool 56 for performing operations within the tire cavity 26. Tool 56 is translatable relative the tire. For example, the tool 56 may be translatable vertically by way of a means for translating vertically 60, and also translatable horizontally by way of a means for translating horizontally 58. Means for translating vertically and means for translating horizontally may each comprise any known means for translating the tool. Tool 56 may also be capable of rotating and pivoting by way of a pivoting device 62 such that it may engage with a particular portion of the interior sidewall surface 24 to perform a desired operation, such as abrading the inner tire surface in preparation for receiving a tire patch or the like. Machine 50, as well as apparatus 10, may be automatically controlled by a logical controller. The logical controller may be any known logical controller. An exemplary embodiment of the logical controller may have a logical processor for processing a logic algorithm stored on a storage device associated with the logical processor. Further, the logical processor may process instructions and receive inputs from the storage device and/or from a user interface to control the machine 50, the tire sidewall deforming and support apparatus 10, and the machine tool 56 for performing any desired operation on the tire 12.

Within machine 50, tire is positioned adjacent the tire sidewall deformation and support apparatus 10. It is understood that machine 50 may include one or more sidewall deforming and support apparatus 10. Such apparatus 10 may be arranged to operate on different, opposing sidewalls 16 and beads 18, or on the same sidewall and bead at different circumferential locations along said sidewall and bead. It is also understood that apparatus 10 and tire 12 may relationally rotate, whether apparatus 10 rotates relative the tire or the tire rotates relative to the apparatus 10, such that tire operations may be continuously performed while said apparatus continuously deforms and supports a tire sidewall.

While this invention has been described with reference to particular embodiments thereof, it shall be understood that such description is by way of illustration and not by way of limitation. Accordingly, the scope and content of the invention are to be defined by the terms of the appended claims.

What is claimed is:

1. A method for deforming a tire sidewall, the method comprising the steps of:
providing a tire having at least one sidewall connected to a corresponding bead;
constraining the bead from moving in a lateral direction of the tire;
engaging the sidewall with an inclined member; and,
moving the inclined member to move at least one of the sidewall and bead in a lateral direction of the tire away from the other until the sidewall is laterally deformed into a laterally deformed configuration supported by the inclined member, the sidewall being flatter in the laterally deformed configuration than in an undeformed configured.

2. The method of claim 1 further comprising the step of;
maintaining the sidewall in the laterally deformed configuration while a tire operation is performed along an inner surface of the tire, the operation being performed through an opening arranged between the corresponding bead and a second bead of the tire to form a pair of beads, the pair of beads being spaced axially relative a rotational axis of the tire to form the opening wherein the step of maintaining the sidewall in a laterally deformed configuration includes supporting the inner surface to support the performance of the tire operation along the inner surface.

3. The method of claim 2, wherein the step of maintaining the sidewall in the laterally deformed configuration includes maintaining the inclined member in a position at which the laterally deformed configuration of the sidewall is achieved.

4. The method of claim 1, wherein the step of moving at least one of the sidewall and bead in a lateral direction is achieved by moving both the sidewall with the inclined member in a lateral direction of the tire and moving the bead in a lateral direction of the tire away from the lateral direction in which the inclined member is configured to move.

5. The method of claim 1, wherein the step of constraining each of the sidewall and bead from moving laterally toward the other includes moving the bead in a radial direction of the tire during the step of moving at least one of the sidewall and bead in a lateral direction away from the other.

6. The method of claim 1, wherein at least a portion of the sidewall is substantially flat in the laterally deformed configuration.

7. The method of claim 1, wherein the step of moving is accomplished by use of an actuating device.

8. An apparatus for deforming and supporting a tire sidewall, the apparatus comprising:
a tire receiving area including a means for securing a tire within the tire receiving area and maintaining open access to an annular tire chamber through an opening arranged between a pair of axially spaced beads of the tire;
a constraining member configured for laterally constraining one of the pair of axially spaced beads, which is connected to a sidewall of the tire, from moving in a lateral direction of the tire;
an inclined member having a sidewall-deforming surface configured to move and to support at least a portion of the tire sidewall; and
an actuating device configured for moving either of the one of the pair of axially spaced beads by way of the constraining member and the sidewall of the tire by way of the inclined member, to arrange the sidewall in a laterally deformed configuration, the sidewall being flatter in the laterally deformed configuration than in an undeformed configuration.

9. The apparatus of claim 8, where the constraining member is a bead-constraining member configured to move in a lateral direction between a bead-constraining position and a bead-receiving position, and where the actuating member is arranged to move the inclined member in a lateral direction between a retracted arrangement and a sidewall deflecting arrangement.

10. The apparatus of claim 9, wherein the constraining member is configured to move in a radial direction or a direction perpendicular to a bead-constraining movement of the bead-constraining member.

11. The apparatus of claim 9, wherein the constraining member is operably attached to an actuator to move between the bead-constraining position and the bead-receiving position.

12. The apparatus of claim 9, wherein the constraining member includes a bead-capturing portion extending radially from the constraining member, the bead-capturing portion configured to engage an inner side of a tire retained within the tire receiving area and extending in a direction biased relative the lateral direction along which the bead-constraining member moves.

13. The apparatus of claim 9, wherein the constraining member is configured to translate in a radial direction biased relative the lateral direction along which the bead-constraining member moves.

14. The apparatus of claim 13, where a biasing member is operably engaged with the bead-constraining member, the biasing member being displaceable in the radial direction.

15. The apparatus of claim 9, where the inclined member configured to move by way of the actuating device.

16. The apparatus of claim 9 further comprising:
an abrading tool configured to extend within a tire arranged within the tire receiving area for abrading an inner tire surface along at least a portion of the sidewall arranged in the laterally deformed configuration.

17. The apparatus of claim 9 further comprising:
a tire, the arranged within the tire receiving area, the constraining member and the inclined member maintaining at least a portion of the sidewall of the tire in a laterally deformed configuration with the inclined member engaging the at least a portion of the sidewall in the lately deformed configuration and the constraining member constraining the bead from moving in a lateral direction of the tire.

18. The method of claim 1, where a constraining member is used in performing the step of constraining the bead, wherein the constraining member is a bead-contraining member configured to move in the lateral direction of the tire between a bead-contraining position and a bead-receiving position, wherein the constraining member is configured to translate in a radial direction biased relative the lateral direction along which the bead-constraining member moves, and where a biasing member is operably engaged with the bead-constraining member, the biasing member being displaceable in the radial direction.

19. The apparatus of claim 8 wherein the actuating device is operably attached to the inclined member and the inclined member is configured to move the sidewall in a lateral direction until the sidewall is arranged in the laterally deformed configuration, and the constraining member is configured to move in a lateral direction away from the lateral direction in which the inclined member is configured to move.

20. The method of claim 1, wherein at least a portion of the sidewall is substantially flat in the laterally deformed configuration.

* * * * *